(12) United States Patent
Gain et al.

(10) Patent No.: US 10,304,241 B2
(45) Date of Patent: May 28, 2019

(54) SYSTEMS AND METHODS FOR SYNTHESISING A TERRAIN

(71) Applicant: University of Cape Town, Cape Town (ZA)

(72) Inventors: James Edward Gain, Cape Town (ZA); Bruce Charles Merry, Cape Town (ZA); Patrick Craig Marais, Cape Town (ZA)

(73) Assignee: University of Cape Town, Cape Town (ZA)

( * ) Notice: Subject to any disclaimer, the term of this patent is extended or adjusted under 35 U.S.C. 154(b) by 80 days.

(21) Appl. No.: 15/569,318

(22) PCT Filed: Apr. 29, 2016

(86) PCT No.: PCT/IB2016/052442
§ 371 (c)(1),
(2) Date: Oct. 25, 2017

(87) PCT Pub. No.: WO2016/174627
PCT Pub. Date: Nov. 3, 2016

(65) Prior Publication Data
US 2018/0122135 A1     May 3, 2018

(30) Foreign Application Priority Data

Apr. 30, 2015   (GB) .................................. 1507471.9

(51) Int. Cl.
    *G06T 17/05*       (2011.01)
    *G06T 19/20*       (2011.01)

(52) U.S. Cl.
    CPC .............. *G06T 17/05* (2013.01); *G06T 19/20* (2013.01); *G06T 2219/2021* (2013.01)

(58) Field of Classification Search
    USPC ........................................................ 382/100
    See application file for complete search history.

(56) References Cited

U.S. PATENT DOCUMENTS

| | | | |
|---|---|---|---|
| 6,288,721 B1 * | 9/2001 | Donoghue | G06T 15/50 345/426 |
| 6,747,649 B1 * | 6/2004 | Sanz-Pastor | G06T 15/00 345/428 |

(Continued)

OTHER PUBLICATIONS

"Symmetric Cluster Set Level of Detail for Real-Time Terrain Rendering", John Judnich, Nam Ling, 2012 IEEE International Conference on Multimedia and Expo (ICME), Jul. 9, 2012, pp. 320-324.

(Continued)

*Primary Examiner* — Ishrat I Sherali
(74) *Attorney, Agent, or Firm* — Harness, Dickey & Pierce, P.L.C.

(57) ABSTRACT

A method and system for synthesising a terrain are provided. The method includes: providing access to multiple exemplar terrain templates and generating a working terrain image with target terrain dimensions and an associated working terrain height image. Generating the working terrain image includes sampling a plurality of the exemplar terrain templates for addition of the templates to the working terrain image, and performing image synthesis to improve the working terrain image including height matching the exemplar terrain samples. The method enables control of modification of the working terrain image by applying user-defined constraints to modify the synthesised terrain. The method outputs the working terrain image as a synthesised terrain in the form of a height-field.

28 Claims, 8 Drawing Sheets

(56) References Cited

U.S. PATENT DOCUMENTS

| | | | |
|---|---|---|---|
| 7,400,330 | B2 | 7/2008 | Lefebvre et al. |
| 7,477,794 | B2 | 1/2009 | Lefebvre et al. |
| 7,567,254 | B2 | 7/2009 | Lefebvre et al. |
| 7,733,350 | B2 | 6/2010 | Lefebvre et al. |
| 7,761,262 | B2 * | 7/2010 | Herman ............... G09B 9/003 345/419 |
| 7,817,160 | B2 | 10/2010 | Lefebvre et al. |
| 7,817,161 | B2 | 10/2010 | Lefebvre et al. |
| 8,068,117 | B2 | 11/2011 | Lefebvre et al. |
| 8,976,169 | B1 * | 3/2015 | Barreirinhas ........... G06T 15/04 345/419 |
| 9,959,670 | B2 * | 5/2018 | Han ........................ G06T 17/20 |
| 10,037,622 | B2 * | 7/2018 | Cwik ..................... G06T 15/04 |
| 2007/0002070 | A1 * | 1/2007 | Hoppe .................. G06T 11/001 345/582 |
| 2010/0066866 | A1 * | 3/2010 | Lim ........................ G06T 15/04 348/241 |
| 2014/0333616 | A1 * | 11/2014 | Ghyme ................... G06T 17/05 345/420 |

OTHER PUBLICATIONS

Lefebvre S., Hoppe H: Parallel controllable texture synthesis. ACM Trans. Graph. 24, 3 (Jul. 2005), 777-786.
Lefebvre S., Hoppe H.: Appearance-space texture synthesis. In ACM SIGGRAPH '06, ACM, pp. 541-548.
Gain J., Marais P., Strasser W.: Terrain Sketching. In Proceedings of I3D '09, pp. 31-38, 2009.
Tassa, Flora Ponjou: "Distributed texture-based terrain synthesis (Thesis)", Jun. 2011 (Jun. 2011), pp. FP-vi, 1-112, XP002759757, University of Cape Town, South Africa. Retrieved from the Internet: URL: https://www.cl.cam.ac.uk/~fp289/pdfs/MScThesis_lowres. pdf [retrieved on Jul. 11, 2016] Sections 3.3, 3.4.
Justin Crause, Andrew Flower and Patrick Marais: "A system for real-time deformable terrain", SAICSIT 11 Proceedings of the South African Institute of Computer Scientists and Information Technologists Conference on Knowledge, Innovation and Leadership in a Diverse, Multidisciplinary Environment, Oct. 3, 2011 (Oct. 3, 2011), pp. 77-86, XP002759756, ISBN: 978-1-4503-0878-6. Retrieved from the Internet: URL:https://dl.acm.org/citation.cfm?id=2072231 [retrieved on Jul. 11, 2016] abstract.

* cited by examiner

SYSTEMS AND METHODS FOR SYNTHESISING A TERRAIN

CROSS REFERENCE TO RELATED APPLICATION

This application is a 371 U.S. National Phase of PCT/IB2016/052442, filed on Apr. 29, 2016, and published in English as WO 2016/174627 A1 on Nov. 3, 2016, which claims priority to United Kingdom patent application number 1507471.9 filed on 30 Apr. 2014, both of which are incorporated by reference herein.

FIELD OF THE INVENTION

The invention relates to systems and methods for synthesising a terrain and, in particular, to systems and methods for synthesising a height-field terrain.

BACKGROUND TO THE INVENTION

Terrain generation is used in the computer game and film industries and aims to generate synthetic terrains.

Existing approaches to creating digital terrain employ either procedural- or simulation-based approaches. Procedural-based approaches typically use multi-scale noise functions which are adapted to take on some characteristics of terrain. While this approach enables large terrains to be created rapidly, the generated terrains tend to lack realism.

Simulation-based approaches, on the other hand may enable the inclusion of, for example, hydraulic and thermal erosion in the generated synthetic height-field terrains. This results in synthetic terrains having a more realistic appearance. However, simulation of synthetic terrains often implements computationally expensive simulation processes which are time consuming to complete. Thus, synthetic terrains generated by simulation can be slow to generate, often to the extent that the synthetic terrains cannot be manipulated or edited by users in real-time.

There is accordingly a need for a technology which alleviates these and other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to a first aspect of the present invention there is provided a method for synthesising a terrain, the method being conducted on a computing device and comprising: providing access to multiple exemplar terrain image-based templates; generating a working terrain image with user-defined target terrain dimensions and an associated working terrain height image, including: providing user-defined constraints including height constraints; sampling a plurality of the exemplar terrain templates for addition of the templates to the working terrain image; and performing image synthesis to improve the working terrain image including height matching the exemplar terrain samples to the user-defined height constraints; controlling modification of the working terrain image by applying user-defined constraints to modify the synthesised terrain; and outputting the working terrain image as a synthesised terrain in the form of a synthesised height-field.

Performing image synthesis may be carried out on a per-pixel basis. The multiple exemplar terrain templates may be generated by transforming an exemplar image into a memory efficient image pyramid in which a sequence of progressively finer resolution images are provided, wherein the image pyramid is stored for use during synthesis. The multiple exemplar terrain templates may include appearance space vectors for matching during image synthesis, including height offsets of the exemplar terrain templates.

The step of controlling modification of the working terrain image may include dynamically adding or deleting user-defined constraints during terrain synthesis, including user-defined height constraints.

Performing image synthesis may include neighbourhood matching that matches specified height offsets and referenced characteristics of exemplar terrain templates.

The method may also include applying temporal coherence system constraints to ensure changes do not propagate away from an edit region of the working terrain image by change control in the form of a per-pixel coherence weighting term preventing divergence.

The method may further include labelling per pixel terrain types for the exemplar terrain templates and determining regions of the working terrain image in which exemplar terrain templates are sampled by referencing terrain types.

The associated working terrain height image may define and manage height offsets in the form of per-pixel height adjustments which are used for synthesis and which are added to an indexed exemplar value enabling exemplar terrain matches to be raised or lowered. Defining height offsets may provide height independence allowing regions of the working terrain image to be lowered or raised during matching of samples.

The step of sampling an exemplar terrain template may include iteratively increasing the resolution of the sampled exemplar terrain and wherein the working terrain image is a multi-resolution structure.

Generating the working terrain image may include generating a coordinate image and a working terrain height image; correcting the coordinate image by selecting, for each coordinate, a candidate replacement coordinate from a set of candidate replacement coordinates, wherein each candidate in the set has a height offset associated therewith; identifying the height offset associated with the selected candidate; and, synthesising the height image based on one or more of existing values, target height and constraints.

Controlling modification of the working terrain image by applying user-defined constraints to modify the synthesised terrain may include: receiving user input in the form of a constraint including one of: a point constraint, a curve constraint, a terrain type constraint, and copy-and-paste constraint.

Further features of the method may include, responsive to receiving a point constraint user input: calculating a target height and combining the target height with a current height; responsive to receiving a curve constraint user input: applying an isocurve extraction approach to smooth an area affected by the curve constraint; responsive to receiving a terrain type constraint user input for a pixel restricting a synthesised pixel to a specific terrain type indexed in the exemplar terrain templates; responsive to receiving a copy-and-paste constraint user input, the copy-and-paste constraint user input including a source region selection from a user and a target region creating a mask for source region and storing the corresponding coordinate image values and height image values, writing the corresponding coordinate image values to the target region, and adding a consistent offset to the corresponding height image values, such that raising or lowering of the pasted region is enabled.

According to a second aspect of the present invention there is provided a system for synthesising a terrain comprising: a memory store providing access to multiple exemplar terrain image-based templates; an image buffer for generating a working terrain image with user-defined target terrain dimensions and an associated working terrain height image; a synthesis engine for generating a synthesised terrain including: an exemplar terrain template sampling component for sampling a plurality of the exemplar terrain templates for addition of the templates to the working terrain image; and an image synthesis component for performing image synthesis to improve the working terrain image including height matching the exemplar terrain samples to user-defined height constraints; a control component for controlling modification of the working terrain image by applying user-defined constraints to modify the synthesised terrain; and an output component for outputting the working terrain image as a synthesised terrain in the form of a synthesised height-field.

The synthesis engine may carry out processing on a per-pixel basis across parallel processors.

The system may include storing exemplar terrain templates in the form of memory efficient image pyramids and associated indexes in working graphic processing unit memory during the synthesising method.

The control component may include a constraint interface having a manipulable control for controlling modification of the working terrain image includes dynamically adding or deleting user-defined constraints during terrain synthesis. The manipulable control may enable user input in the form of a constraint including one of: a point constraint, a curve constraint, a terrain type constraint, and copy-and-paste constraint.

The image synthesis component may include a matching component for neighbourhood matching that matches specified height offsets and referenced characteristics of exemplar terrain templates.

The image synthesis component may include a coherence component for applying temporal coherence system constraints to ensure changes do not propagate away from an edit region of the working terrain image by change control in the form of a per-pixel coherence weighting term preventing divergence.

The image synthesis component may include a terrain type component for labelling per pixel terrain types for the exemplar terrain templates and determining regions of the working terrain image in which exemplar terrain templates are sampled by referencing terrain types.

The image buffer may define and manage height offsets in the form of per-pixel height adjustments which are used for synthesis and which are added to an indexed exemplar value enabling exemplar terrain matches to be raised or lowered.

The exemplar terrain template sampling component may include iteratively increasing the resolution of the sampled exemplar terrain and wherein the working terrain image is a multi-resolution structure.

According to a third aspect of the present invention there is provided a computer program product for synthesising a terrain, the computer program product comprising a computer-readable medium having stored computer-readable program code for performing the steps of: providing access to multiple exemplar terrain templates; generating a working terrain image with user-defined target terrain dimensions and an associated working terrain height image, including: providing user-defined constraints including height constraints; sampling a plurality of the exemplar terrain templates for addition of the templates to the working terrain image; and performing image synthesis to improve the working terrain image including height matching the exemplar terrain samples; controlling modification of the working terrain image by applying user-defined constraints to modify the synthesised terrain; and outputting the working terrain image as a synthesised terrain in the form of a synthesised height-field.

According to a fourth aspect of the present invention there is provided a method for synthesising a terrain substantially as described herein with reference to the figures.

According to a fifth aspect of the present invention there is provided a system for synthesising a terrain substantially as described herein with reference to the figures.

BRIEF DESCRIPTION OF THE DRAWINGS

The invention will now be described, by way of example only, with reference to the accompanying representations in which.

DETAILED DESCRIPTION WITH REFERENCE TO THE DRAWINGS

Figure 1:
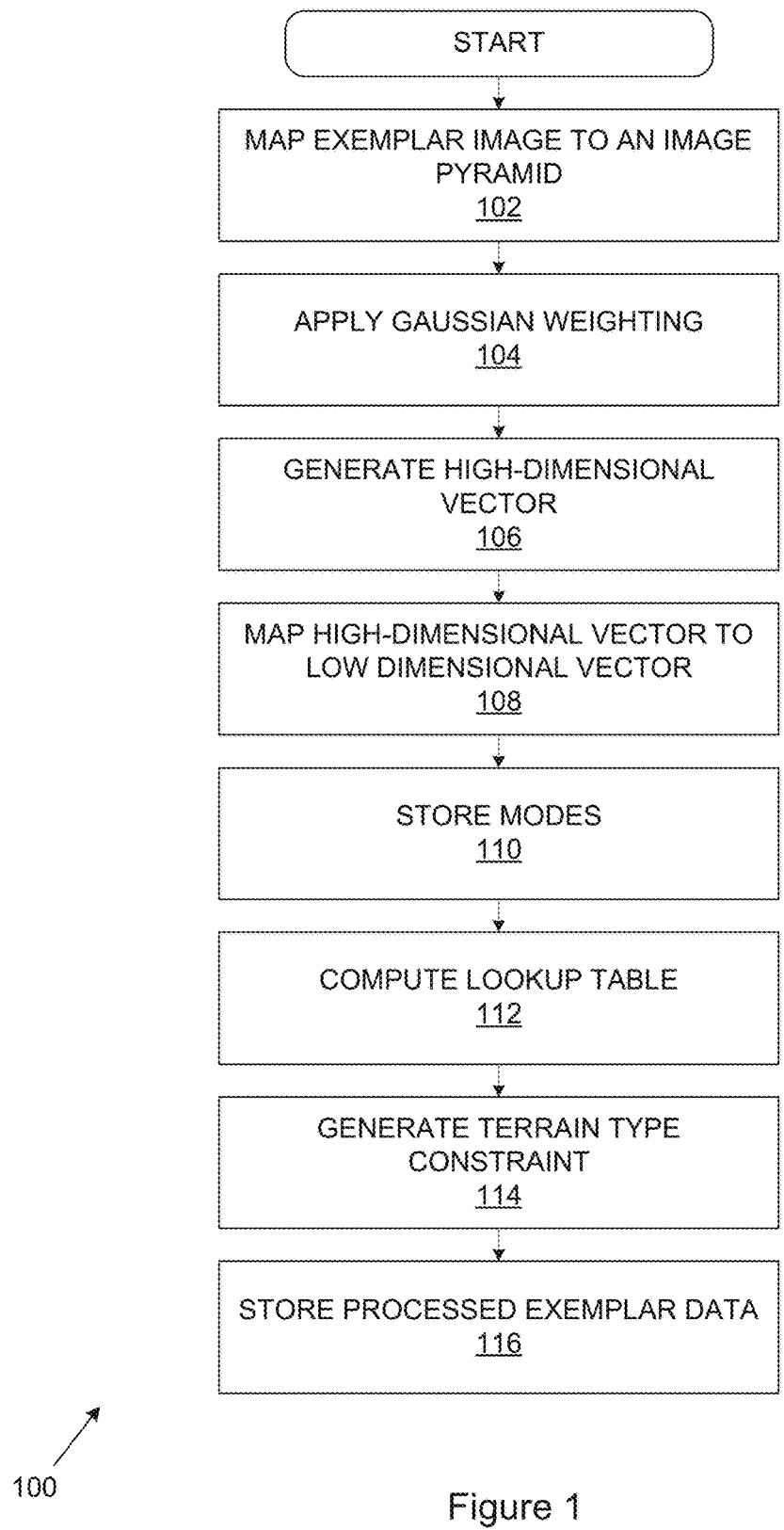
FIG. 1 is a flow diagram which illustrates a pre-processing method.

The systems and methods described herein provide design tools usable in creating realistic height-field terrain for use in computer games and computer generated imagery (e.g. for animation and film). The systems and methods synthesize new terrains in real-time, subject to the constraints sketched by a designer, utilising real terrain examples drawn from a database of digital elevation maps (DEMs). The described systems and methods are advantageous as they combine speed, ease of use and user control.

The described systems and methods enable realistic height-field terrains to be synthesised based on a database of terrain samples. The terrain samples are image-based representations of real terrain.

The synthesis process is controllable by user input, in the form of the constraints that may be sketched or painted onto a pre-existing height-field terrain input (which may be flat). The synthesized output terrains may exhibit the same kinds of geomorphological features found in real terrains (e.g. freely available height-fields (DEMs) from the US Geological Survey) while obeying the user constraints as far as possible. The described systems and methods may also enable a copy-and-paste functionality allowing placement of static terrain elements within a final synthesised output. The final synthesized height-field can be exported as a surface mesh model and used in the production of computer games and film visual effects, three dimensional modelling and the like.

Exemplary constraints which may be input by a user include: point, curve, terrain type and copy-and-paste constraints, all and all can be used when synthesizing a height-field. The constraints, along with a database of exemplars, provide the necessary information for synthesis to begin. Some embodiments anticipate graphics processing unit (GPU) implementation which, together with carefully designed data structures, may enable support for real-time height-field editing and synthesis.

The described systems and methods enable height-field synthesis by extending known parallel texture synthesis algorithms. The systems and methods described herein incorporate constraints required for terrain height-field synthesis. A terrain height-field typically has a specific structure which differs from a generally repetitive structure produced by texture generators. The systems and methods described herein enable height constraints to be incorporated into the synthesis of the terrains. The described systems and methods further enable multiple exemplar sources to be used in creating a height-field which is sufficiently varied and obeys constraints input by a user.

The described method generates realistic height values by matching constraints (which include simple region constraints but also more complex point and curve constraints) supplied by a user, and utilising individual samples of height data from real terrains to generate a new terrain.

The systems and methods described herein synthesize texture coordinates, rather than pixel intensities. These coordinates can be indexed into the exemplar texture and a simple texture lookup then returns the synthesized texture. Additionally, an appearance space transformation is implemented, which allows for faster, higher quality synthesis.

Furthermore, some embodiments of the described systems and methods utilise an image pyramid which is more efficient (in terms of memory usage) than a Gaussian stack. This reduces memory costs, requiring $O(m*m)$ space for a m×m images vs $O(log2(m)*m*m)$ for a Gaussian stack. The image pyramid is produced as a pre-process using Gaussian filtering followed by down-sampling, which will be explained in greater detail below. Exemplar images may be transformed in this way and stored for use during synthesis. The coordinate image pyramid generated during coordinate synthesis may be stored in a float (real-valued) image buffer (as supported by OpenCL, CUDA etc.) and bi-linear interpolation may be used to avoid quantization of coordinates during up/down-sampling operations.

In this way, the synthesis algorithm is multi-resolution in synthesising a new terrain; it combines detail from a sequence of height fields, each of which represent height detail at a different scale (where "scale" refers to the size of features on the terrain).

Additionally, the described systems and methods enable height adjustment terms in an exemplar matching process. This is advantageous when dealing with height-fields that have additional height constraints imposed on them.

The described systems and methods may also introduce a per pixel terrain type which allows a user to determine which regions of the image should be synthesized from specific source exemplars. This may be specified by type painting operations in the interface.

FIG. 1 is a flow diagram which illustrates a pre-processing method (100). The method may be conducted by a computing device prior to the synthesis of a terrain. The computing device has access to a database of exemplar image-based terrains. In some embodiments, the database is populated with digital elevation map (DEM) exemplars.

At a first stage (102), each exemplar image is mapped to an exemplar image pyramid. This stage (102) may include retrieving the exemplars from a database. Mapping exemplars to an image pyramid defines a sequence of progressively finer resolution images: $E^L, E^{L-1}, \ldots, E^0$. Here, $E^0$ is the original input exemplar, and each image $E^{L-1}$ is down-sampled to $E^L$ by a factor of 2 in x and y. All the exemplars for a given pyramid level are stored in one image. In one embodiment, the image in which the exemplar image pyramid (E) is stored is an OpenCL image.

At a next stage (104), a Gaussian weighting is applied to a region around each pixel. For example, in one implementation, Gaussian weighting is applied to a 5×5 pixel region around each input pixel for each pyramid level. This stage (108) is performed for each level of the image pyramid.

At a following stage (106), these pixels, including the Gaussian weighted region around each pixel, are then gathered into a high-dimensional vector. In this example, the high dimensional vector may be a 25-dimension vector. This stage (106) is performed for each level of the image pyramid.

At a next stage (108), the high-dimensional vector containing the Gaussian-weighted pixels is mapped to a low-dimensional vector. The low-dimensional vector may be referred to as an appearance space vector or an appearance space image. The stage (108) of mapping the high-dimensional vector to a low-dimensional vector may include performing principal components analysis (PCA) on the high-dimensional vector. In this exemplary embodiment, performing principal component analysis on the high-dimensional vector generates an appearance space image which is a 4-dimension vector (or a space-4 vector). This stage (108) is performed on each pyramid level to output an "appearance space" image pyramid (A): $A^L, A^{L-1}, \ldots, A^0$.

The set of modes of the principal components corresponding to the PCA transformation, per appearance space level, is stored in an OpenCL image, with each element quantized to 16 bits, at a following stage (110). To further reduce space, the first mode may be assigned the 5×5 Gaussian weighted mean height and thus it does not need to be stored explicitly as it can be directly inferred from $E^L$. This creates a slight blurring effect which ameliorates sampling errors. Quantization reduces data bandwidth requirements. In this way, a height parameter is provided in the appearance space level which is used during the later synthesising method for matching the appearance space heights with user constrained heights.

A lookup table $C_{1 \ldots k}^i(p)$ of the k most similar 5×5 neighbourhoods for each pixel in each level i of the appearance space image pyramid is pre-computed at a next stage (112). This may accelerate subsequent appearance space neighbourhood matching queries. The matches are chosen to ensure that potential matches are not too close to one another. This requires k coordinate pairs to be stored per pixel.

The intent, in the later processing described below, is that for each "source" 5×5 region of each appearance space exemplar at each level, the most similar "target" regions are found (usually including itself as the most similar), subject to some constraints. Unless the source region is at the finest resolution for the whole exemplar set, the target must not be at the finest resolution for its exemplar (so that it is possible to upsample to the next finer level). It must not be too close to the edge, such that jitter would cause coordinates to become out-of-range. This may be carried out by simulating the worst case for jitter. Each of the k matches after the first must be at least a given distance or on a different exemplar from the previous ones, to encourage variety. Similarity between two regions is measured by shifting each to have a mean height of 0, and then taking the sum of squared differences of the components.

The method starts by finding the best match for every source, then the second-best, and so on. In the cases where the source is also a valid target, it is immediately assigned as the best match rather than using random initialisation, since there cannot be any better candidate.

In one embodiment, a value of k=2 is used to prevent matches which straddle or touch the image edges. The first neighbourhood is usually the identity (that is the neighbourhood around the given pixel), which is problematic if this is at the edge of the image. Since subsequent matches are chosen to be spaced apart from each other, with k=2 the second match can be chosen, which will jump away from the edge. This follows the same approach as appearance space.

In addition to the appearance space image and exemplar image pyramids, the method may include a stage (114) of generating a per-pixel terrain type constraint $T(p)$. This includes, during database generation (i.e. at the time of populating the database of exemplars), adding a region label/identifier to each pixel in the input exemplar $T^0(p)$. This label propagates through the coarser level so each pixel on a coarser level i, $T^i(p)$, is set the dominant label in the corresponding 2i×2i region in the input exemplar. These annotated type pyramids are available during the synthesis phase. The identifier is a bit string where each bit position corresponds to a particular terrain type. If the bit in that position is set to '1' then that terrain type is present, otherwise it is not.

At a following stage (116), processed data, which may include one or more of the exemplar image pyramid (E), the appearance space image pyramid (A), the lookup table ($C_1 \ldots k$), the per pixel terrain type constraint (T) for each level is stored for use in a synthesis phase. A per-pixel height parameter may be included in the processed exemplars.

Having performed the pre-processing steps, terrain synthesis may be performed. The terrain synthesis steps may be performed on the pre-processed data by the computing device. Some of the terrain synthesis steps may be performed on a parallel computing component (e.g. a GPU) associated with the computing device.

Figure 2A:
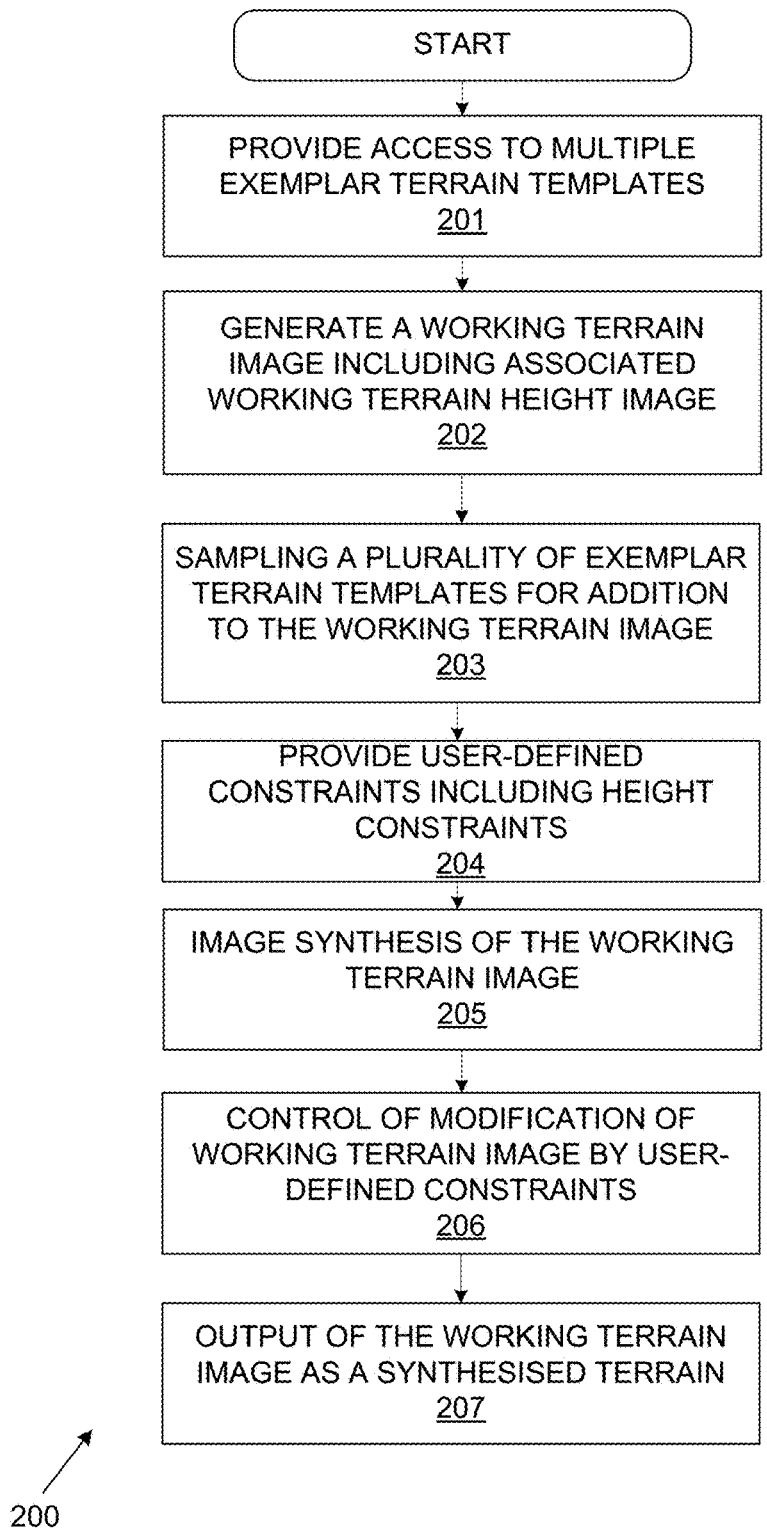
FIG. 2A is a flow diagram which illustrates a method for synthesising a terrain.

Referring to FIG. 2A, a flow diagram illustrates an embodiment of a generalised method (200) for synthesising a height-field terrain.

The method includes providing access (201) to multiple exemplar terrain templates. The exemplar terrain templates may be pre-processed according to the method of FIG. 1 including transforming an exemplar image representation into a memory efficient image pyramid in which a sequence of progressively finer resolution images are provided, wherein the image pyramid is stored for use during synthesis. Additionally, an appearance space and per-pixel terrain type constraint may be included in the templates. In addition to the pixel coordinates, a per-pixel height adjustment is added to the exemplar value when indexed.

A user-defined working terrain image may be generated (202) with target terrain dimensions and an associated working terrain height image which is used for image height dimensions (the working terrain height image may be referred to as a working image stack). The user-defined working terrain image is the working image that is being generated by a user to synthesise a required image meeting their requirements, including height requirements of a synthesised image.

The working terrain image may have target synthesis terrain dimensions x by y and a coordinate image S may be initialized from a first selected exemplar image. One of the higher levels of an exemplar image pyramid may be used as a basis for the initial coordinates. A corresponding height image V, also x by y, may be created for height offsets for each pixel. The height image may be initialised to 0 per pixel.

The initialised coordinate image may be at a first resolution and this may be upsampled to a finer resolution. Both the coordinate image and the height image may be upsampled on a per-pixel basis. Jitter is added during upsampling which is based on a pseudo-random offset controlled by weight values. Upsampling may be repeated until a required resolution is reached.

A plurality of the exemplar terrain templates may be sampled (203) for addition of the templates to the working terrain image for required features. User-defined constraints (204) may be provided using a user constraint interface from which height constraints for the working terrain image may be derived.

Image synthesis may be carried out (205) which will be described in detail below to improve the working terrain image including height matching the exemplar terrain samples to user constraints for storing in the working terrain height image. The working terrain height image may be calculated during the matching process in order to satisfy the constraints.

It should be noted that the exemplar heights when they are pre-processed do not have a height image; only the synthesised terrain has a height image for the purpose of matching the constraints.

The image synthesis carry out a sequence of correction passes which adjusts the image extracted using the coordinates to better match the exemplar images used to synthesise from. Matching is done in appearance space with neighbourhood and height-offset matching. The working terrain height image is used to introduce height constraints into the synthesis engine. This allows us to raise or lower exemplar terrain matches to better fit the input constraints.

The user constraint interface enables control (206) of modification of the working terrain image by applying user-defined constraints to modify the synthesised terrain. Additional image synthesis to accommodate the user-defined constraints may be carried out and is described in detail below.

The method outputs (207) the synthesised working terrain image as a synthesised terrain in the form of a height-field.

Figure 2B:
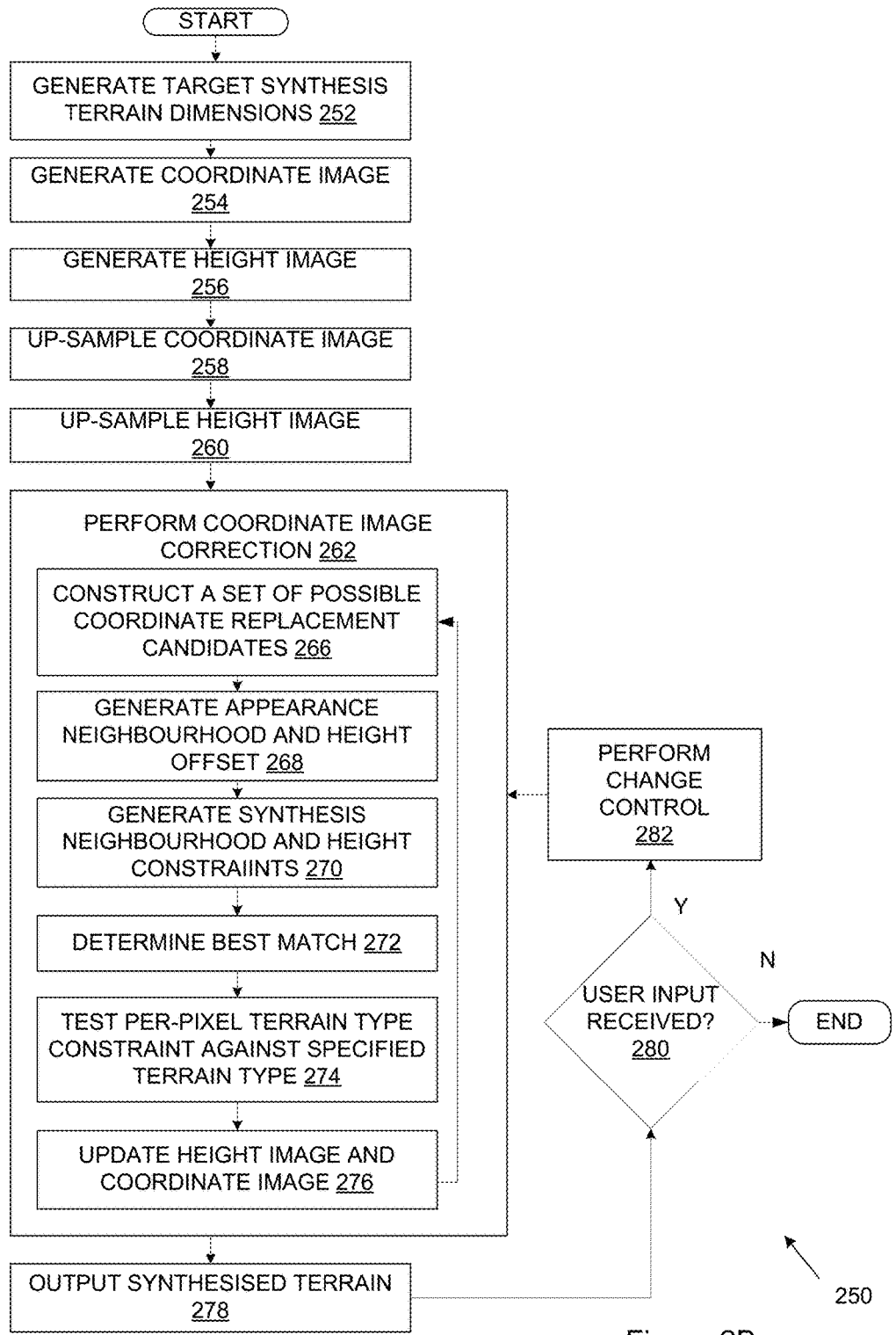
FIG. 2B is a flow diagram which illustrates further details of an embodiment of a method for synthesising a terrain.

FIG. 2B is a flow diagram which illustrates an embodiment of a method (250) for synthesising a height-field terrain. Initially, processed data stored during pre-processing may be loaded into a memory of the computing device. For example, in one embodiment, the processed exemplars may be loaded into a memory of a GPU associated with the computing device. In some cases, by using image pyramids in place of image stacks, which has the benefit of requiring less memory space, all of the processed data for a given synthesis may be loaded into memory. The processed exemplar data may be carefully arranged to minimize storage requirements. Pre-loading the processed data may have the benefit of reducing access times and thus improving the speed at which the synthesis steps may be performed. Furthermore, by using a GPU or other appropriate parallel computing component, significant speed benefits may be achieved.

Multiple images may be packed side by side into a single chart of images for access. This works as long as sub-pyramids are built on each sub-image of the chart because then neighbourhoods do not span the boundaries between sub-images. However, it is important that neighbourhood matching is able to jump between sub-images.

At a first stage (252), target synthesis terrain dimensions, (e.g. x and y dimensions), are generated. These dimensions may be chosen by the user who decides what terrain size is desired.

A coordinate image (or an index map), S, of size x by y is generated (254). The coordinate image S is initialised from a first exemplar image and each pixel S(p) of the coordinate image stores the coordinates of the corresponding exemplar pixel.

A height image (or a per-pixel height adjustment image) V, of the same dimensions (size x by y) as the coordinate image providing height adjustment z is generated (256). The height image may be initialised to contain "0" per pixel. The height image V is used to manage height offsets, as will be explained below.

The coordinate image S is upsampled (258) and the corresponding height image (V) is upsampled to reach the desired image dimensions. The stage (258) of upsampling the coordinate image includes adding jitter.

Upsampling is performed iteratively. In the first iteration, the upsampled coordinate image is the initialization image. At subsequent iterations the coordinate image to be upsampled is the output of the previous iteration. The upsampling generates a current resolution level having a finer resolution level than the previous resolution level.

In the illustrated embodiment, upsampling is performed on the coordinate image and the height image as per equations (1) and (2) below:

$$S^{i-1}\left(2p \pm \frac{1}{2}\right) = 2S^i(p) \pm \frac{1}{2} + rH\left(2p \pm \frac{1}{2}\right) \quad (1)$$

$$V^{i-1}\left(2p \pm \frac{1}{2}\right) = V^i(p) \quad (2)$$

Here, H(p) is a jitter function that produces a pseudo-random offset in the range [−1,1]. The parameter r controls the amount of jitter. In one exemplary implementation, the parameter r may be set to 0.4. Upsampling may be performed until the target image dimensions are reached.

In addition to the coordinates S(p), a per-pixel height adjustment, V(p), is added to the exemplar value when indexed. This allows the raising or lowering of exemplar terrain matches to fit the input constraints.

At a following stage (262) the coordinate image correction is performed. This stage (262) may include applying a sequence of correction passes to adjust coordinates so that the corresponding height-field image (which is eventually extracted using those coordinates, as will be explained below) better matches the exemplar image which was used in the synthesis. In an exemplary implementation, two correction passes are performed, each of which contains four sub-passes. Coordinate image correction may be performed for each level i. Sub-passes are carried out because, due to parallelisation conflicts, it is not possible to correct adjacent pixels simultaneously. Rather, they are corrected in a spaced pattern during each sub-pass until all pixels have been corrected and this then constitutes a main pass.

The stage (262) of correcting the coordinate image may include performing matching. Matching is performed in appearance space, rather than directly on the exemplars and, as noted above, is accelerated by using the look-up table of pre-computed best matches, $C_{1,2}^i(p)$. Matching aims to identify the most suitable replacement coordinates from the pre-computed table of best matches.

Performing matching includes an initial stage (266) of constructing a set (Q) of possible coordinate replacement candidates for each $S^i(p)$. In this example, the set of possible coordinate replacement candidates is constructed as per Equation (3) below $$Q = \{C_j^i(S^i(p+\Delta)-\Delta) | 1 \leq j \leq 2, \Delta \in \{-1,0,1\}^2\}, \quad (3)$$

At a following stage (268), diagonal neighbours of each candidate (q) in appearance space of the set of possible coordinate replacement candidates (i.e. for each candidate q∈Q) are gathered to generate an appearance neighbourhood $N_E$. Each candidate has a height offset h associated therewith. In the illustrated example, four diagonal neighbours are gathered in the appearance neighbourhood as per Equation (4), below $$N_E(q,h) = \{A^i(q+\delta)+h\alpha | \delta \in \{-1,1\}^2\} \quad (4)$$

where $a = (1\ 0\ 0\ 0)^T$.

At a next stage (270), a synthesis neighbourhood, $N_S$, is gathered as per equations (5) and (6) below $$g^i(u,v) = A^i(S^i(u+v)-v) + V^i(u+v)a \quad (5)$$

$$N_S = \left\{\frac{1}{3}\sum_{M \in \mathcal{M}} g^i(p+\delta, M\delta) \middle| \delta \in \{-1,1\}^2\right\}, \quad (6)$$

where, $$\mathcal{M} = \left\{\begin{pmatrix} 0 & 0 \\ 0 & 0 \end{pmatrix}, \begin{pmatrix} 1 & 0 \\ 0 & 0 \end{pmatrix}, \begin{pmatrix} 0 & 0 \\ 0 & 1 \end{pmatrix}\right\}.$$

It should be noted that the height offsets are considered during the matching process and not simply the appearance space neighbourhood. A combination of exemplar pixel and height offset are chosen such that the exemplar neighbourhood plus offset best matches the combination of the current synthesised neighbourhood and the constraints.

Having defined the appearance neighbourhood $N_E$ and the synthesis neighbourhood $N_S$ the best match with which to update $S^i(p)$ is determined at a following stage (272). Determining the best match is performed by evaluating a score for each candidate q as per Equation (7) below $$\min_{h \in \mathbb{R}}(\kappa \|N_S - N_E(q,h)\|^2), \quad (7)$$

where κ=1 if j=1 and κ=2 otherwise. Equation (7) determines the height offset h for which the best score overall, for all the candidates q, will be yielded.

At a following stage (274), the per-pixel terrain type constraint may be tested against the specified terrain type. Candidates q which do not obey the terrain type constraints will be removed from the pool of matches, and new candidates may be generated.

Thus, in addition to per-pixel height offset constraints, per-pixel terrain type constraints may be considered when synthesizing a new terrain. Terrain type constraints are painted onto the height map and may place an additional requirement that a synthesized pixel must come from a specified terrain type, $R^o(p)$. If no constraint is painted, then all terrain types are considered as viable matches.

The type information is in an image pyramid containing type information, which is used to constrain the synthesised terrain. However, from an interface perspective the user needs to set the type at a 2d position. To do this a ray is projected onto the current synthesised terrain through the mouse cursor position and used to lookup the 2d location.

During synthesis, each synthesis pixel p in the coordinate image has a set of target terrain types $R^i(p)$. Target terrain types are used to control the terrain exemplar which will be applied and may be modified by a user.

The target terrain type constraint is satisfied if $T^i(S^i(p)) \in R^i(p)$, that is, if the type of the selected exemplar coordinate appears in the target set. This asymmetric matching enables unconstrained pixels that are allowed to take on any terrain type. Where no constraint is painted, $R^0(p)=T$, which is the set containing all terrain types present in the database. For $i>0$, $R^i(p)$ is computed as the union of the corresponding 2×2 target sets at level i−1.

However, any sets equal to T are excluded from this union, since otherwise narrow regions of constraints may be washed out at coarser levels. A local region of each level may be updated as the user modifies $R^0$ (e.g. by selecting a new exemplar terrain).

As mentioned above, candidates which fail to meet the target terrain type constraints are rejected. If all possible matches are rejected, a seeding approach is applied to guarantee the constraint. For example, for each terrain type in $R^i(p)$, nine new candidates are picked at random (using a hash of the synthesis coordinates) which are then evaluated as per Equation (7). For efficiency, a list of coordinates is randomly preselected and stored for each terrain type.

At a next stage (276), the height image $V^i(p)$ is updated with the height offset h for which the best score is obtained and the coordinate image $S^i(p)$ is updated with the corresponding candidate q. As mentioned above, multiple passes, and in some cases, multiple sub-passes of the coordinate correction stage may be performed.

The height image, which may also be referred to as a per-pixel height adjustment, V(p) is stored in addition to the coordinate image S(p). The height image may be added to the exemplar value at the time of indexing the exemplar and, by doing so, enables the exemplar terrain matches to be raised and lowered so as to better fit input constraints.

At a following stage (278), a terrain is synthesised using the coordinate image and the height image. The height image, $V^i(p)$ enables height offsets, which are generated per pixel, to be used in the synthesis of the terrain. The stage of synthesising the terrain may include a stage of outputting the synthesised terrain on a display screen. For a given synthesised pixel, the synthesised height is the sum of two values: the height sampled from the exemplar using the coordinates in the coordinate image (with bilinear interpolation); and the height offset stored in V.

Once the terrain has been synthesised, user input may be received at a following stage (280). The user input may, for example, be to set a different terrain target type; to introduce geometric constraints; or, to copy a selected region of the synthesised terrain or image exemplar. The user input causes the synthesised terrain to be modified in real-time (or near real-time).

Modifying the synthesised terrain, and in particular, the constraints, in real time may introduce a complication: small changes do not necessarily exhibit either temporal coherence or spatial locality, and can cause unexpected popping artefacts. This may be exacerbated by multi-resolution synthesis, where a small change in the input constraints can propagate from the coarser levels and have a large and abrupt impact on the final terrain.

To address this, the method (250) includes a stage (282) of performing change control responsive to receiving user input. The stage (282) of performing change control may include applying a per-pixel coherence weighting term, $W^i(p) \in [0,1]$, where values close to zero enforce stasis and values close to one freely allow adaptation. Applying a per-pixel coherence weighting term may be implemented by recording the result of each correction pass (e.g. by saving the coordinate image S output by the coordinate image correction stage (212)). The coherence terms are stored logically in a separate pyramid whose dimensions correspond to the synthesis pyramid but act as a constraint on the synthesis.

In the subsequent frame, this result is presented as an extra matching candidate (i.e. at stage (266)), with its cost multiplied by $W^i(p)$. Weights towards zero thus bias the synthesis towards repeating the previous result, except where this would provide an unacceptably poor match. For example, multiplying the previously stored candidate by a weight of 0, will give it a perfect score and it will be selected in preference to all others, thus enforcing stasis. Different values of W will bias towards the stored candidate to a greater or lesser extent.

To ensure that re-synthesis with the same constraints yields a repeatable outcome, it may not be sufficient to record just the final corrected pixel for each level. The stage (282) of performing change control includes a step of storing results for all sub-passes i.e. a snapshot of S after each sub-pass. This may prevent matches from diverging during earlier sub-passes, causing oscillation even for unchanged constraints.

The stage (282) of performing stage control may thus use three different weight values in $W^0$: unweighted $W^0(p)=1$ inside the area of influence of manipulated constraints to encourage free alteration to meet the constraints; coherent $W^0(p)=0.25$ over the remainder of the terrain to preserve locality and reduce popping; and locked down $W^0(p)=0$ in regions that the user has painted over with a 'freezing' brush. To derive $W^i(p)$, for $i>0$, a zero (frozen) value is chosen if any pixel of the associated 2×2 block at level i−1 is zero; otherwise the most frequently occurring weight is selected. This may ensure that region freezing is properly dominant.

Figure 3:
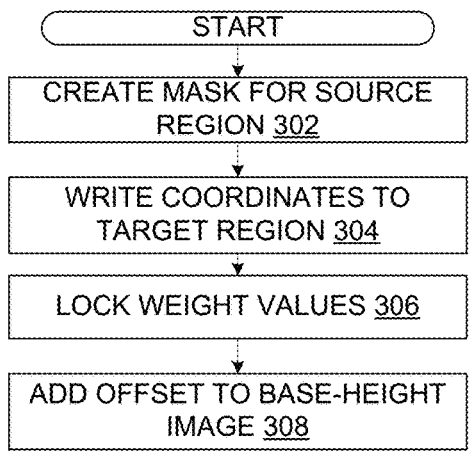
FIG. 3 is a flow diagram which illustrates additional steps of the method illustrated in FIG. 3 which may be performed responsive to receiving user input.

Depending on the type of user input received, additional processing steps may be performed. FIG. 3 is a flow diagram which illustrates steps of a method (300) for synthesising a terrain, which steps are performed responsive to receiving a user input in the form of copying a region from an exemplar or the synthesised terrain. The method (300) enables a user to copy-and-paste a selected region of the synthesised terrain and includes an initial stage of receiving a source region selection from a user. In one exemplary implementation, the user may draw a closed loop to indicate the region to be copied. A widget is then inserted at the region centroid: this is used to reposition the selected region and to alter its height.

The method (300) includes a following stage (302) of creating a mask for the source region in question ($\Omega$) and storing the relevant coordinate values $S^i(\Omega)$ for all levels and sub-passes. The same dilation procedure as for coherence freezing is applied. At a following stage (304), the coordinates are written to the target region ($\Omega'$) and, at a next stage (306), the weight values in the target are locked to prevent changes: $W^o(\Omega')=0$. This enables translation from source to target. At a following stage (308), a consistent offset (d) is added to the base height image $V^i(\Omega')+d$, such that raising or lowering of the pasted region is also enabled. Since the area around the target is unweighted the pasted region blends well with the surrounding synthesis.

As mentioned, and referring again to FIG. 2B, user input received at stage (280) may include receiving geometric constraints which provide for per-pixel height offsets. The per-pixel height offsets (or constraints) may be specified by the user using either point or curve constraints. The user may thus alter the height offsets provided to provide a generated h term, which may be used in the synthesis equations presented earlier. This process is discussed in greater detail below, with reference to FIG. 4.

Figure 4:
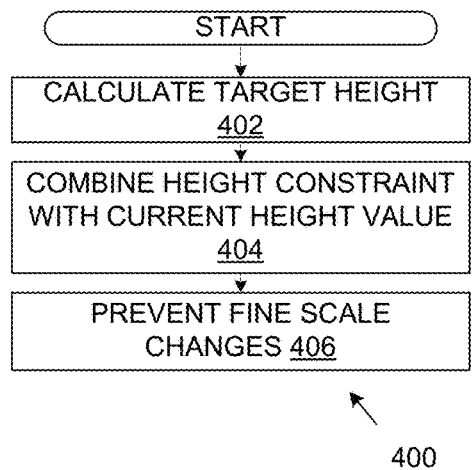
FIG. 4 is a flow diagram which illustrates a method for synthesising a terrain in which a user can manipulate the terrain using constraints.

FIG. 4 is a flow diagram which illustrates a method (400) for synthesising a height-field terrain in which a user can manipulate the terrain using constraints. Exemplary constraints include point constraints, curve constraints or the like. The constraints may have a configurable region of influence associated therewith. The constraints may be manipulated by the user using widgets. The widgets may also allow local control of the gradient around the constraint by means of 'handles' which the user may tilt and/or swivel. The region of influence of a constraint is set by pulling or pushing on the handles. In some embodiments, the terrain may be shaded to indicate the influence extent. The widgets may enable manipulation of constraints including: raising and lowering, selecting an area, tilting, swivelling, translating, etc.

Intersecting constraint curves cause a height-only widget to be inserted at the intersection point, to avoid constraint ambiguity.

Once the constraint widgets have been manipulated, the target height needs to be calculated and passed to the synthesis component at a first stage (402). This requires interpolation of the implied target height values from the relevant widget to the rest of the terrain which includes generating a height target value $h_t$, for each terrain pixel that lies within the region of influence of a constraint. If constraints overlap then the constraint with the strongest influence (as determined by (8) and (9) below) is chosen.

The stage (402) of calculating a target height may include placing a plane at the constraint point, with normal determined by the constraint gradient and then projecting the terrain pixel position vertically onto this plane to determine the target height $h_t$. For curves there can be different gradients for each side and therefore two separate planes may apply.

Once height targets, $h_t$, have been generated for each terrain pixel, they are, at a following stage (404) combined with the current height value, $h_c$, returned by the previous synthesis (i.e. stage (276) in FIG. 2B), to produce a new target height offset for the next synthesis step. This is accomplished using a specially tailored $C^1$ blending function, shown in Equations (8) and (9) below $$t(d) = sd, \, b(d) = \frac{-\lambda}{3t(d)^2}, \, c(d) = b(d)t(d)^3 + \lambda t(d) \quad (8)$$

$$\phi_d(x) = \begin{cases} \lambda x + c(d) & \text{if } x < -t(d) \\ \lambda x - c(d) & \text{if } x > t(d) \\ -b(d)x^3 & \text{otherwise,} \end{cases} \quad (9)$$

Figure 5:
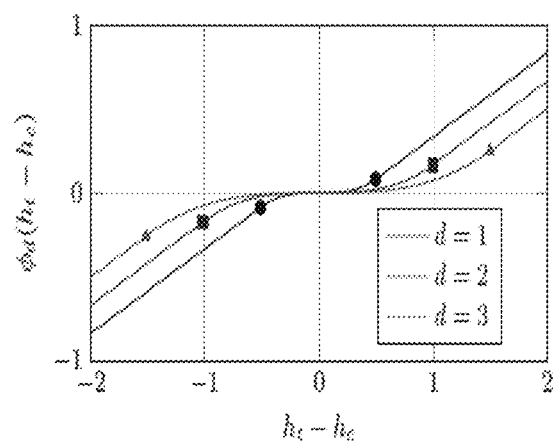
FIG. 5 is a graph illustrating the output of a blending function implemented in the method illustrated in FIG. 4.

Referring to Equations (8) and (9), the value d corresponds to the distance (in the image plane) between the constraint location and the pixel under consideration. In one example $\lambda$ may and s may each be set to 0.5. The target height offset for synthesis is then $h_c+\phi_d(h_t-h_c)$. FIG. 5 illustrates an exemplary output of the blending function for various values of d.

At a following stage (406), fine scale changes are prevented to enforce a coarse-to-fine area of effect. In one example, this may be implemented by modifying the area of effect by a multi-resolution scale factor min(radius, $4\times2^i$), where radius is the area of effect of the curve, and i is the multiresolution level.

This has the effect that the area of effect starts very local and doubles with each coarser synthesis level but is always capped by the area of effect of the constraint. This prevents fine-scale changes being applied far from the constraint site, where they are unnecessary. Additionally, geometric constraints for the finest two levels of synthesis may be disabled to avoid locally over constraining results (e.g. where narrow and/or ridges flat-topped ridges result if synthesis is allowed at the very finest levels).

The method described above with reference to FIG. 4 enables a synthesized pixel to be attached to a point constraint (encompassing a ground-plane location, elevation, gradient vector, and radius of effect).

Figure 6:
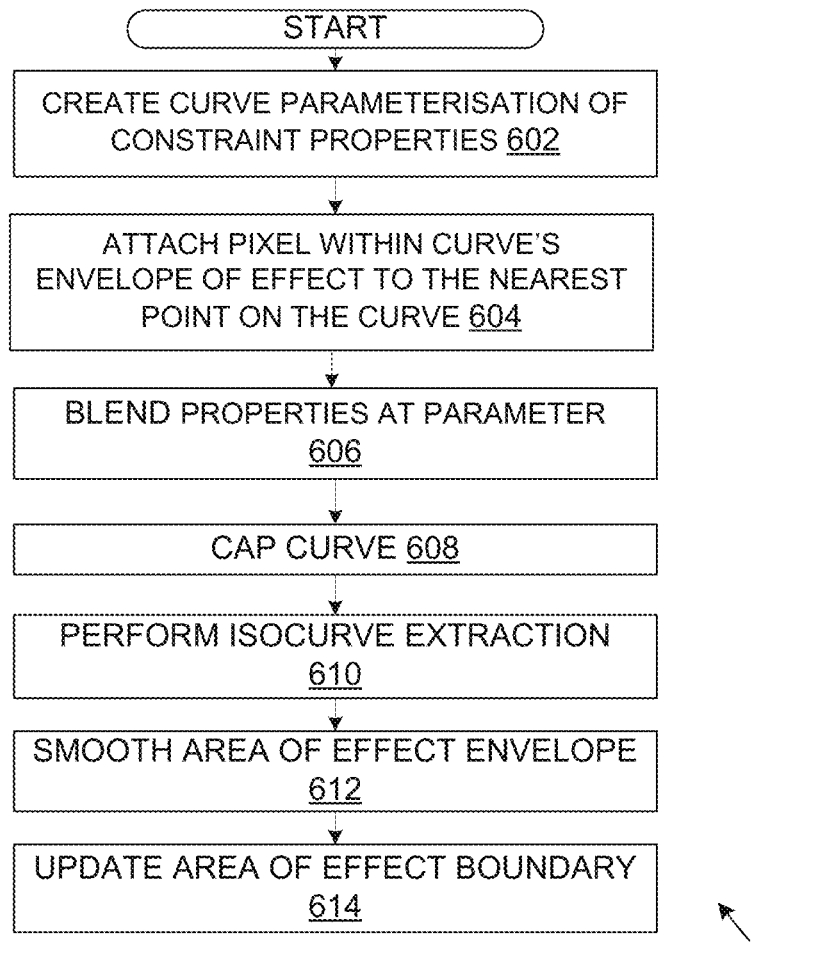
FIG. 6 is a flow diagram which illustrates a method which generalises the method illustrated in FIG. 4 to curve constraints.

FIG. 6 is a flow diagram which illustrates a method (600) which generalises the method (400) described above with reference to FIG. 4 (which related to point constraints) to curve constraints.

At a first stage (602), a curve parametrisation of constraint properties (location, elevation, left and right area of effect, and left and right gradient) is created. This may include using Hermite interpolation of the property values set by the curve- and junction-located widget handles.

At a following stage (604), a pixel within the curve's envelope of effect is attached to the nearest point on the curve C(t) and, at a next stage (606), the properties at parameter t are blended using the blending function of Equations (8) and (9) described above. The assigned properties also depend on whether the pixel falls to the left or right of the curve constraint.

The assigned properties also depend on whether the pixel falls to the left or right of the curve constraint. For instance pixels to the left will use location, elevation, left area of effect and left gradient, while those to the right will use location, elevation, right area of effect and right gradient.

At a following stage (608), the curve is capped. Capping a curve may involve fitting a Hermite curve between the left and right envelope ends at both the start and end of the curve. This can be done so that the curve properties (elevation, area of effect and gradient) are smoothly interpolated along the capping Hermite curve.

The stage (604) of attaching a pixel to the nearest point on the curve (closest-point queries) may be accelerated using a distance field that is recomputed only when the horizontal shape of the curve changes, such as after a sketching operation.

While distance values are continuous in a distance field the closest point on the curve can jump between neighbouring distance field samples. For example a 'C'-shaped curve has a medial axis down the centre and closest points on the curve jump from one arm of the 'C' to the other on either side of this medial axis. Since the area of effect depends on position along the curve through the parametrization value (t) this can cause $C^0$ discontinuities in the area of effect boundary.

To overcome this, isocurve extraction is performed at a following stage (610). Isocurve extraction involves the use of marching squares to derive a polyline that lies on the border between those pixels that lie within the curve boundary and those that lie outside. This produces a polyline envelope that is converted into closed piecewise Hermite curves that interpolate the polyline vertices.

At a next stage (612), the area of effect envelope is smoothed which is then used to update the area of effect boundary and hence the overall extent of the deformation at a following stage (614).

Figures 7A, 7B:
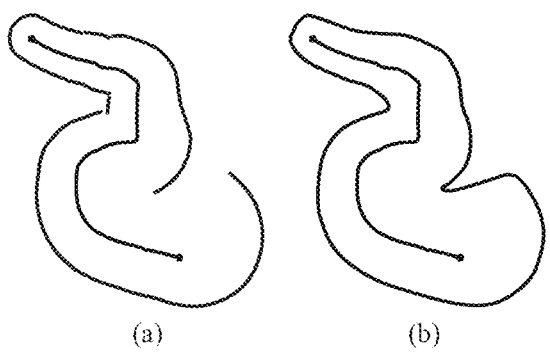
FIG. 7A shows an example of a discontinuity that can occur in implementations of the systems and methods described herein.
FIG. 7B shows the discontinuity illustrated in FIG. 7A as corrected using isocurve extraction.

The distance field does not need to be modified further because the constraint satisfaction and synthesis matching process is robust to discontinuities, particularly when they occur further away from the curve. An example of this problem is illustrated in FIGS. 7A and 7B. FIG. 7A shows the types of discontinuity that can occur while FIG. 7B shows the corrected isocurve extraction result.

A single constraint (point or curve) is applied to each pixel within its region of influence, but the influences of different constraints may well intersect. To accommodate such situations overlapping constraints may be combined by blending the values of $h_t$ and a, and recomputing t and C, using Equation (8). In the blend, these values are weighted proportionately to the inverse of the distance to the corresponding constraint. For each pixel, the sums $\Sigma b^i a^i$, $\Sigma b^i h_t^i$ and $\Sigma b^i$, are maintained, where i runs over the constraints and $b^i$ is the blend weight of the i'th constraint. This is advantageous in that a constraint can be modified by subtracting it, altering its properties, and then adding it back into the sums, without having to re-evaluate all the overlapping contributors.

Figure 8:
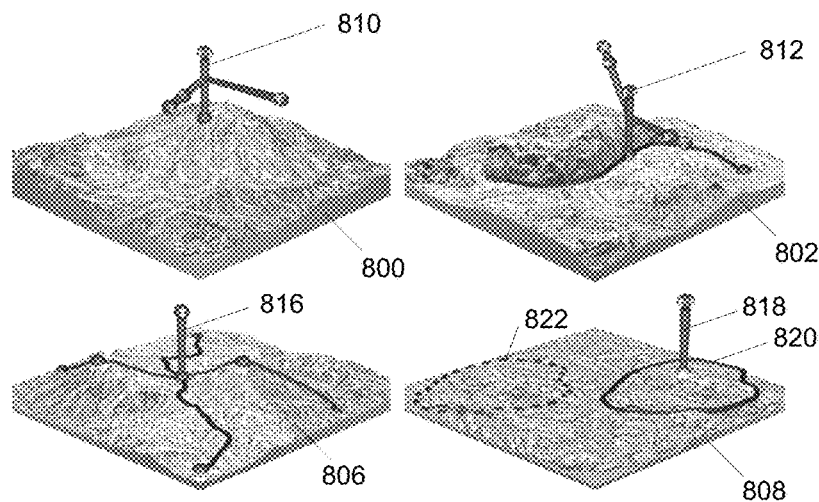
FIG. 8 illustrates widgets which may be manipulated by a user in order to input constraints into a synthesised terrain.

FIG. 8 shows four exemplary synthesised terrains (800), (802), (804) and (806) which may be manipulated using widgets (810), (812), (814) and (816) in order to input constraints into the synthesised terrain. The widget (810) in the first terrain (800) is a widget with which a point constraint may be input and manipulated. The widget (812) in the second terrain (802) is a widget with which a curve constraint may be input and manipulated. The widget (814) in the third terrain (804) uses crossing constraints in the form of two curves with a point manipulator. The widget (816) in the fourth terrain (806) is a copy-and-paste widget with which a source region (820) can be selected and a target region (822) designated.

The described method and system may be extended to include multi-scale terrain. The described synthesis may be re-tooled to allow a broader range of scales, and in particular source exemplar terrains that are sampled at different resolutions.

This enables a wider range of terrain scales, so that both finer resolutions (potentially with sub-meter sampling depending on the availability of suitable input data) and larger areas can be supported simultaneously within the same terrain. This improves the applicability of the method and system to computer games. The main aim of multi-scale terrain extensions is to allow for the synthesis of terrains that are both larger and have finer details, thereby improving the realism and applicability of the generated terrains, particularly in the context of computer games. In the most extreme case this will enable terrains that are continent sized (thousands of kilometres across) sampled at sub-meter accuracy.

Instead of requiring that every source terrain has the same dimensions (i.e. number of pixels) and scale (area covered by each pixel), varying scales may be supported within the exemplar database. In theory, this should allow for continent-sized terrains that are sampled down to sub-meter accuracy. However, this does mean that source data of terrains sampled at that level of accuracy is required. This may be provided by digital artists manually adding extra detail to terrains using existing 3D modelling packages during database preparation. Alternatively, more finely sampled data from the U.S. Geological Survey (USGS) may be obtained.

To incorporate multi-scale terrains, the core method and system may be expanded as follows. The core data structures of the exemplar database may be changed to allow input exemplars with different dimensions and scales. This requires modifying the synthesis algorithms that employ the database to generate terrains. In particular, the system needs to switch when a terrain reaches the limits of its resolution to another with finer scale. For improved efficiency a number of tasks that were previously resident on the CPU may be moved onto GPU.

The end result is a system in which the user can choose to synthesize a specific range of scales. This is necessary as memory limitations often make it infeasible to synthesize the entire range of scales on the GPU at once. One typical use-case is to add detail to an existing terrain, which can significantly improve close views of the terrain as are required for open world games where the user's avatar typically walks across the surface of the game world.

The described systems and methods enable pixel-based terrain synthesis using a database of terrain exemplars. The pixel-based paradigm allows synthesis to be parallelised, which leads to very significant speed improvements. While parallel texture synthesis has been around for some years, these approaches are specifically aimed at creating textures with broadly repeating structures. Height-fields, on the other hand, contain structures created by water erosion, weathering and geological processes. Using a conventional texture synthesis algorithm to generate such a "terrain texture" will produce very poor output. The described systems and methods modify parallel texture synthesis schemes to produce the structure required in a terrain height-field.

As mentioned above, the described systems and methods may use several "texture" sources (height-fields) when synthesizing terrains which may lead to greater variation in the synthesised terrain.

Furthermore, the described systems and methods utilise an image pyramid with real-valued coordinates. This is advantageous over using an image stack as the number of exemplars that can be processed in memory may be increased. Potential quantization issues by may be overcome using real-valued coordinates.

The described systems and methods further perform augmented neighbourhood matching in which new matching terms are introduced into the neighbourhood matching process. In particular, the described systems and methods may implement augmented neighbourhood matching including specified height offsets (allowing raising or lowering terrain) and certain exemplar characteristics.

Yet further, the described systems and methods may introduce new per-pixel terms to ensure that synthesized values do not vary outside a region of influence as the terrain constraints are edited.

The described systems and methods may provide a copy-and-paste functionality in which a coherence mechanism is used to allow for a number of copy-and-paste features. Specifically, repositioning a section of a synthesized terrain including raising or lowering its overall height may be enabled. The described systems and methods may enable copying and transplanting of an exemplar region and/or pasting in an entire exemplar, thus enabling the editing of existing terrains. The described systems and methods provide functionality allowing regions with complex shapes and copy-and-pasting within a synthesized terrain as well as from source exemplars. The pasted region may be edited further.

The copy and paste functionality may allow the user to make a selection by drawing onto the terrain. The user may then be required to right click and select 'copy' from the context menu. The context can then be used to paste the region at the mouse location. The pasted selection can then be moved as required.

The described systems and methods may provide a number of terrain-specific widgets with which constraints for terrain design may be placed. These include point constraints, curve constraints and region painting. The constraints allow a user to control the broad shape and characteristics of the generated terrain.

The described systems and methods provide advantages, including: rapid prototyping cycles (no simulation is required, only fast, interactive synthesis); and sophisticated copy-and-paste (the system supports comprehensive copy-and-paste of terrain regions, which allow existing terrain features to be dropped into the height-field). The pasted region can also be edited further.

The full system encompasses a synthesis engine and a constraint specification interface as described further below. Constraints can be of several varieties: point, curve, terrain type and copy-and-paste, and all can be used when synthesizing a height-field. The constraints, along with the exemplar database, provide the necessary information for synthesis to begin. Due to an efficient GPU implementation and carefully designed data structures, the system is fast enough to support real time height-field editing and synthesis.

The introduction of several constraint types enable realistic terrain generation. These constraints further complicate the synthesis process since they need to be incorporated into the per-pixel algorithm. Finally, a number of modifications (such as the image pyramid) ensure multiple exemplars may be handled.

The described method and system provide: rapid prototyping cycles (no simulation is required, only fast, interactive synthesis); intuitive constraint and design tools (simulations can be hard to control accurately and may limit the extent of what can be created—the described constraints are intuitive e.g. drawing down a valley, raising a mountain, changing the characteristics of a terrain region); sophisticated copy-and-paste (the system supports comprehensive copy-and-paste of terrain regions, which allow existing terrain features to be dropped into the height-field. The pasted region can also be edited further. All this is handled seamlessly by the constrained synthesis process.

Figure 9A:
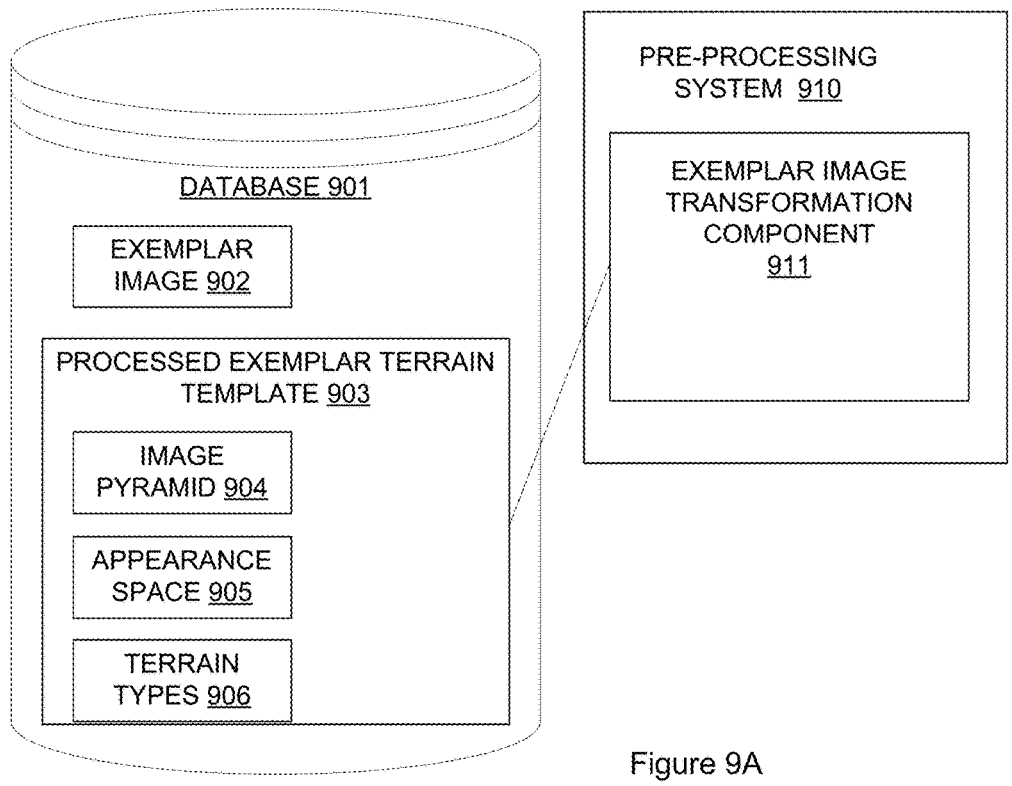
FIG. 9A is a block diagram showing an embodiment of a pre-processing system.
Figure 9B:
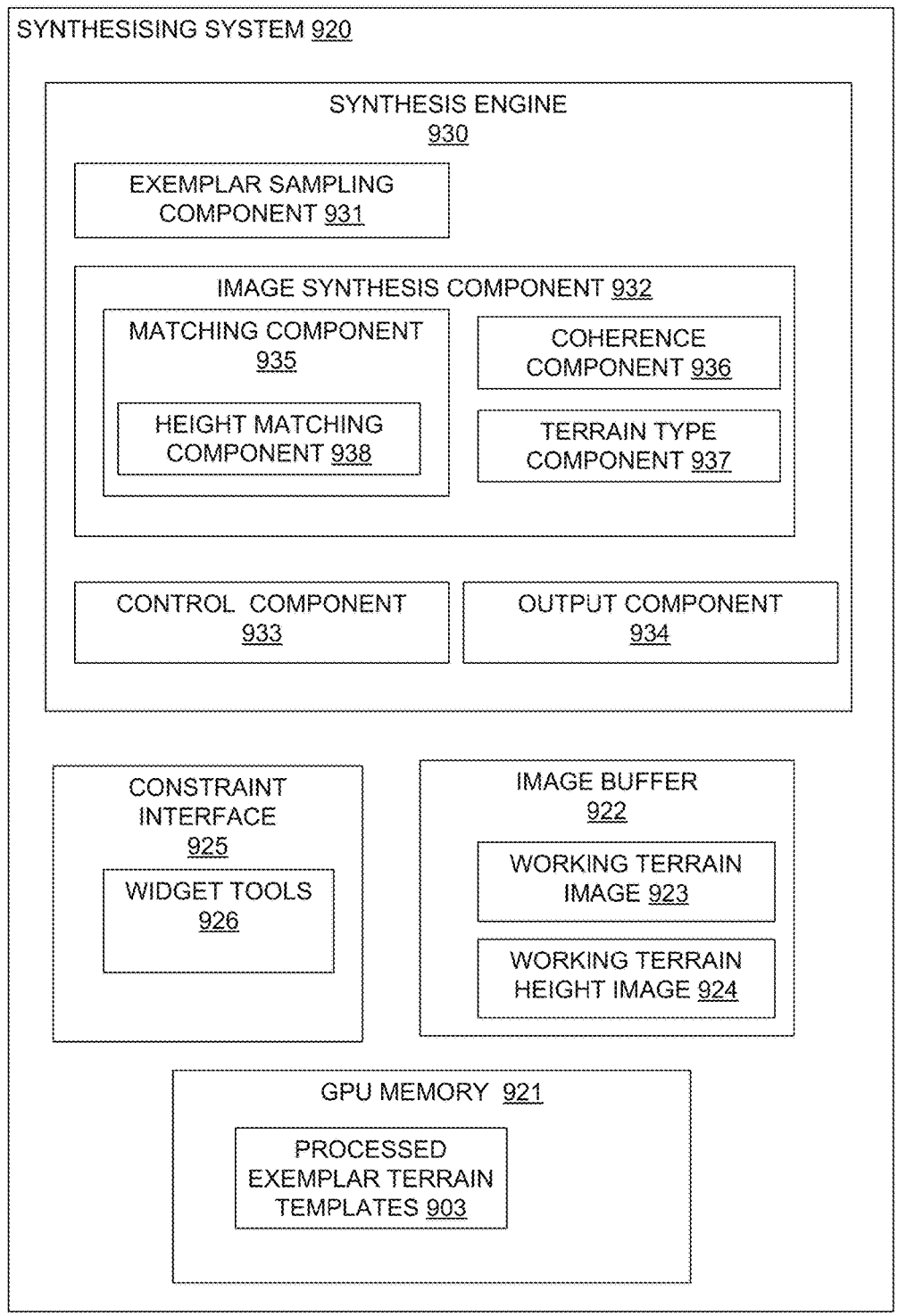
FIG. 9B is a block diagram showing an embodiment of a synthesising system.

FIGS. 9A and 9B illustrate a pre-processing system and a synthesising system in which various aspects of the disclosure may be implemented.

FIG. 9A shows a pre-processing system (910) including an exemplar image transformation component (911) which transforms multiple exemplar images (902) stored in a database (902) into processed exemplar terrain templates (903) for use in the described synthesising system. The transformations carried out are described in detail in relation to FIG. 1.

Each processed exemplar terrain templates (903) includes an image pyramid (904) as a memory efficient image pyramid in which a sequence of progressively finer resolution images are provided, wherein the image pyramid is stored for use during synthesis, an appearance space (905) used for image matching, and terrain types (906) used for type constraints.

FIG. 9B shows a described synthesising system (920). The processed exemplar terrain templates (903) may be stored for use during synthesis on GPU memory (921). This is possible because image pyramids are arranged with minimum storage requirements.

An image buffer (922) is used to store the working terrain image (923) and associated working terrain height image (924) which may be in the form of an image pyramid generated during coordinate synthesis and stored as a real-valued float image buffer with bi-linear interpolation used to avoid quantization of coordinates during the sampling operations.

The synthesising system (920) may include a synthesis engine (930) which may carry out the described image synthesis on a per-pixel level in multiple resolution. Parallel processing using GPU processing may be used to carry out the synthesis in an approximately real-time manner in response to user-defined restraints. The synthesis engine (930) may include an image synthesis component (932) including components for carrying out the described functionality of the synthesis process including a matching component (935) with a height matching component (938), coherence component (936), and terrain type component (937).

An exemplar terrain template sampling component (931) may be provided for sampling a plurality of the exemplar terrain templates (903) form the GPU memory (921).

A control component (933) may be provided for controlling modification of the working terrain image by applying user-defined constraints which may be input via a constraint interface (925) having a plurality of widget tools (926) for manipulating the required constraints.

An output component (934) may output the working terrain image as a synthesised terrain in the form of a height-field for use in terrain modelling.

The system may be organised into a core system and multiple plug-ins that extend the core. The core system may be responsible for managing terrain data and displaying it on screen. Those parts of the system that manipulate terrains may be separated into plug-in modules that can be enabled and disabled as needed. These include the brush, curve, point, and copy tools. Such organisation of the code results in the system being maintainable and allows rapidly incorporation of additional functionality.

The display of synthesized terrain may become a bottleneck if multi-scale terrain is implemented. To overcome this, the memory required for rendering terrains may be reduced and further improved with a level-of-detail system that displays detail with a resolution dependent on the distance from the camera. With current hardware it is possible to display an 8,000×8,000 resolution terrain.

The availability of a recovery mechanism is important to the usability of interactive systems. Without it, a user may make mistakes that can be expensive and sabotage task progress. Undo functionality may be rewritten on top of the well-established command stack of the graphical user interface framework used. All modifications to the system may be encapsulated by commands. These commands modify the system state when pushed (redo) or popped (undo) from the undo stack.

Navigation around a terrain may be provided via an arc-ball interface. An arc-ball camera lets one rotate an object around a centre point. Terrains can thus be spun around or flipped like a plate. It is also possible to move closer or further away from the focal point. This camera mode is useful when orbiting around a point of interest. However, to simulate walking on the ground or flying in an aircraft, an arc-ball is not optimum. A first person shooter (FPS) camera mode may therefore be provided. The camera mode supports forward/backwards, left/right, or up/down movement via the keyboard or while using the mouse to look around.

The camera may enable switching seamlessly between these two modes. Camera animations may also be provided such that all rotations, translations and zoom changes automatically interpolate smoothly between states. To minimise user disorientation, camera roll correction may be provided. This automatically flips the camera upright when a series of movements results in a roll. The arc-ball camera mode may be provided as the default because this makes it easier to orbit around a point of interest, such as the currently active manipulator.

Storing and retrieving program state to and from a project file may accommodate changes in system architecture. In addition to saving constraints, the exact synthesizer state may also store to disk.

The Unity 3D game engine is a very popular platform amongst test users. As a result, the ability to export terrains in Unity 3D's RAW file format is a preferred functionality and may be implemented as a plug-in module.

In the system terrain is modified using a variety of manipulators: curves, points, brushes and copy-paste regions. In a complex terrain modelling project there can be dozens of these manipulators present on the terrain. To manage this complexity, a side panel may be provided with a listing of manipulators. Listed manipulators can be renamed, grouped, selected, deleted and have their visibility status toggled, with all changes being reflected in the main terrain view.

There may be the difficulty in judging scale and users may lose track of how large their created terrain features are, often creating mountains with unnaturally tall peak prominence. The current coordinates and elevation of terrain under the mouse cursor may be displayed in a status bar. Additionally, the user may place a familiar scale indicator (the island of Manhattan or a football field) onto the terrain. Further, a contour-band rendering mode may be activated with user configurable contour values.

Figure 10:
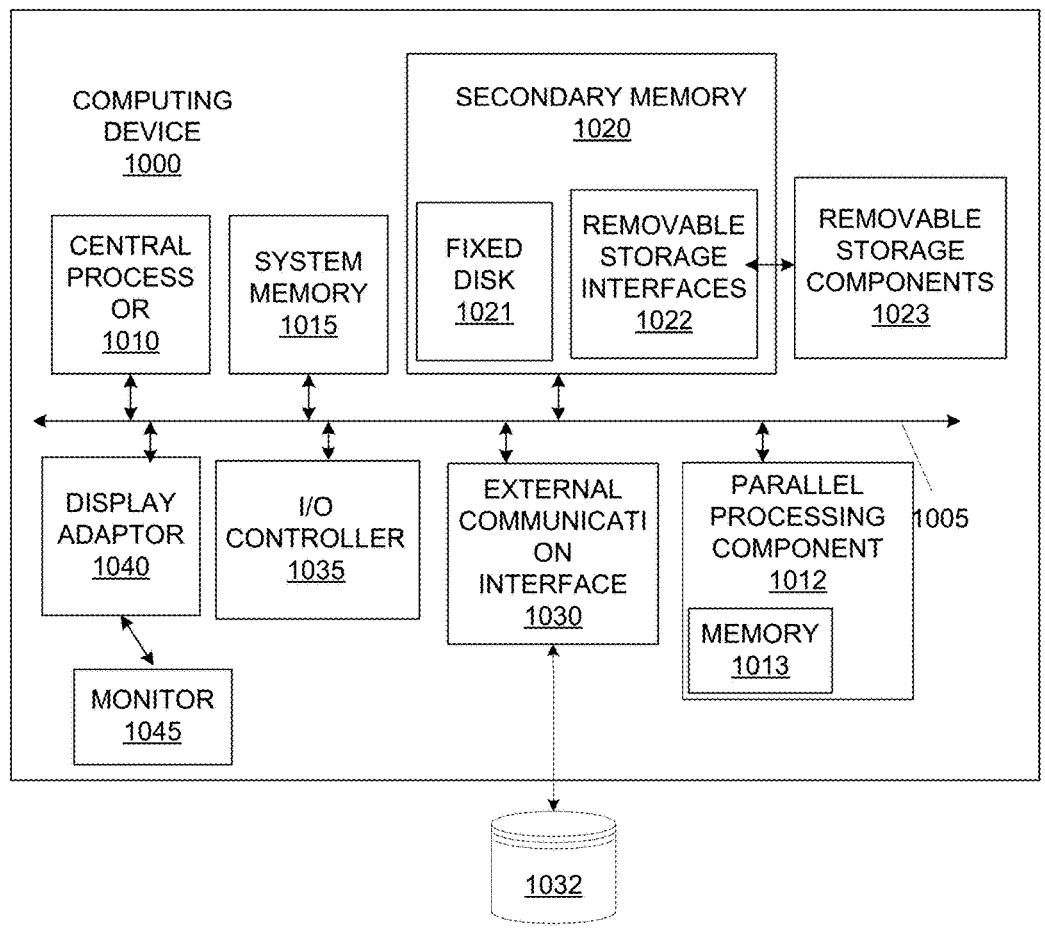
FIG. 10 is a block diagram which illustrates an example of a computing device in which various aspects of the disclosure may be implemented.

FIG. 10 illustrates an example of a computing device (1000) in which various aspects of the disclosure may be implemented. The computing device (1000) may be suitable for storing and executing computer program code. The various methods described previously may use any suitable number of subsystems or components of the computing device (1000) to facilitate the functions described herein.

The computing device (1000) may include subsystems or components interconnected via a communication infrastructure (1005) (for example, a communications bus, a crossover bar device, or a network). The computing device (1000) may include at least one central processor (1010) and at least one memory component in the form of computer-readable media.

The computing device (1000) may also include a parallel processing component (1012). The parallel processing component (1012) may include a graphics processing unit (GPU) which may be used together with the central processor (1010) for accelerated computing. The parallel processing component (1012) may have its own memory (1013) in which data may be stored and from which data may be retrieved. The memory components may include system memory (1015), which may include read only memory (ROM) and random access memory (RAM). A basic input/output system (BIOS) may be stored in ROM. System software may be stored in the system memory (1015) including operating system software. The memory components may also include secondary memory (1020). The secondary memory (1020) may include a fixed disk (1021), such as a hard disk drive, and, optionally, one or more removable-storage interfaces (1022) for removable-storage components (1023). The removable-storage interfaces (1022) may be in the form of removable-storage drives (for example, optical disk drives, etc.) for corresponding removable storage-components (for example, an optical disk, etc.), which may be written to and read by the removable-storage drive. The removable-storage interfaces (1022) may also be in the form of ports or sockets for interfacing with other forms of removable-storage components (1023) such as a flash memory drive, external hard drive, or removable memory chip, etc.

The computing device (1000) may include an external communications interface (1030) for operation of the computing device (1000) in a networked environment enabling transfer of data between multiple computing devices (1000). Data transferred via the external communications interface (1030) may be in the form of signals, which may be electronic, electromagnetic, optical, radio, or other types of signal. The external communications interface (1030) may enable communication of data between the computing device (1000) and other computing devices including servers and external storage facilities. Web services may be accessible by the computing device (1000) via the communications interface (1030). The external communications interface (1030) may provide access to a database (1032) in which data can be stored and organised and from which data may be retrieved. The database (1032) may store a number of exemplar terrains which may be used by the computing device in synthesising terrains. The external communications interface (1030) may also enable other forms of communication to and from the computing device (1000) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (1010). A computer program product may be provided by a non-transient computer-readable medium, or may be provided via a signal or other transient means via the communications interface (1030).

Interconnection via the communication infrastructure (1005) allows a central processor (1010) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (1000) either directly or via an I/O controller (1035). These components may be connected to the computing device (1000) by any number of means known in the art, such as a serial port or universal serial bus (USB) port. One or more monitors (1045) may be coupled via a display or video adapter (1040) to the computing device (1000).

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for synthesising a terrain, the method being conducted on a computing device and comprising:
    providing access to multiple exemplar terrain image-based;
    generating a working terrain image with user-defined target terrain dimensions and an associated working terrain height image, including:
        providing user-defined constraints including height constraints;
        sampling a plurality of the exemplar terrain templates for addition of the templates to the working terrain image; and
        performing image synthesis to improve the working terrain image including height matching the exemplar terrain samples to the user-defined height constraints;
    controlling modification of the working terrain image by applying user-defined constraints to modify the synthesised terrain; and
    outputting the working terrain image as a synthesised terrain in the form of a synthesised height-field.

2. The method as claimed in claim 1, wherein performing image synthesis is carried out on a per-pixel basis.

3. The method as claimed in claim 1, wherein the multiple exemplar terrain templates are generated by transforming an exemplar image into a memory efficient image pyramid in which a sequence of progressively finer resolution images are provided, wherein the image pyramid is stored for use during synthesis.

4. The method as claimed in claim 3, wherein the multiple exemplar terrain templates include appearance space vectors for matching during image synthesis, including height offsets of the exemplar terrain templates.

5. The method as claimed in claim 1, wherein controlling modification of the working terrain image includes dynamically adding or deleting user-defined constraints during terrain synthesis, including user-defined height constraints.

6. The method as claimed in claim 1, wherein performing image synthesis includes neighbourhood matching that matches specified height offsets and referenced characteristics of exemplar terrain templates.

7. The method as claimed in claim 1, including applying temporal coherence system constraints to ensure changes do not propagate away from an edit region of the working terrain image by change control in the form of a per-pixel coherence weighting term preventing divergence.

8. The method as claimed in claim 1, including labelling per pixel terrain types for the exemplar terrain templates and determining regions of the working terrain image in which exemplar terrain templates are sampled by referencing terrain types.

9. The method as claimed in claim 1, wherein the associated working terrain height image defines and manages height offsets in the form of per-pixel height adjustments which are used for synthesis and which are added to an indexed exemplar value enabling exemplar terrain matches to be raised or lowered.

10. The method as claimed in claim 9, wherein defining height offsets provides height independence allowing regions of the working terrain image to be lowered or raised during matching of samples.

11. The method as claimed in claim 1, wherein sampling an exemplar terrain template includes iteratively increasing the resolution of the sampled exemplar terrain and wherein the working terrain image is a multi-resolution structure.

12. The method as claimed in claim 1, wherein generating the working terrain image includes generating a coordinate image and a working terrain height image;
   correcting the coordinate image by selecting, for each coordinate, a candidate replacement coordinate from a set of candidate replacement coordinates, wherein each candidate in the set has a height offset associated therewith;
   identifying the height offset associated with the selected candidate; and,
   synthesising the height image based on one or more of existing values, target height and constraints.

13. The method as claimed in claim 1, wherein controlling modification of the working terrain image by applying user-defined constraints to modify the synthesised terrain includes:
   receiving user input in the form of a constraint including one of: a point constraint, a curve constraint, a terrain type constraint, and copy-and-paste constraint.

14. The method as claimed in claim 13, including, responsive to receiving a point constraint user input:
   calculating a target height; and,
   combining the target height with a current height.

15. The method as claimed in claim 13, including, responsive to receiving a curve constraint user input:
   applying an isocurve extraction approach to smooth an area affected by the curve constraint.

16. The method as claimed in claim 13, including, responsive to receiving a terrain type constraint user input for a pixel:
   restricting a synthesised pixel to a specific terrain type indexed in the exemplar terrain templates.

17. The method as claimed in claim 13, including, responsive to receiving a copy-and-paste constraint user input, the copy-and-paste constraint user input including a source region selection from a user and a target region:
   creating a mask for source region and storing the corresponding coordinate image values and height image values;
   writing the corresponding coordinate image values to the target region; and,
   adding a consistent offset to the corresponding height image values, such that raising or lowering of the pasted region is enabled.

18. A system for synthesising a terrain comprising:
   a memory store providing access to multiple exemplar terrain image-based templates;
   an image buffer for generating a working terrain image with user-defined target terrain dimensions and an associated working terrain height image;
   a synthesis engine for generating a synthesised terrain including:
      an exemplar terrain template sampling component for sampling a plurality of the exemplar terrain templates for addition of the templates to the working terrain image; and
      an image synthesis component for performing image synthesis to improve the working terrain image including height matching the exemplar terrain samples to user-defined height constraints;
   a control component for controlling modification of the working terrain image by applying user-defined constraints to modify the synthesised terrain; and
   an output component for outputting the working terrain image as a synthesised terrain in the form of a synthesised height-field.

19. The system as claimed in claim 18, wherein the synthesis engine carries out processing on a per-pixel basis across parallel processors.

20. The system as claimed in claim 18, including storing exemplar terrain templates in the form of memory efficient image pyramids and associated indexes in working graphic processing unit memory during the synthesising method.

21. The system as claimed in claim 18, wherein the control component includes a constraint interface having a manipulable control for controlling modification of the working terrain image includes dynamically adding or deleting user-defined constraints during terrain synthesis.

22. The system as claimed in claim 21, wherein the manipulable control enables user input in the form of a constraint including one of: a point constraint, a curve constraint, a terrain type constraint, and copy-and-paste constraint.

23. The system as claimed in claim 18, wherein the image synthesis component includes a matching component for neighbourhood matching that matches specified height offsets and referenced characteristics of exemplar terrain templates.

24. The system as claimed in claim 18, wherein the image synthesis component includes a coherence component for applying temporal coherence system constraints to ensure changes do not propagate away from an edit region of the working terrain image by change control in the form of a per-pixel coherence weighting term preventing divergence.

25. The system as claimed in claim 18, wherein the image synthesis component includes a terrain type component for labelling per pixel terrain types for the exemplar terrain templates and determining regions of the working terrain image in which exemplar terrain templates are sampled by referencing terrain types.

26. The system as claimed in claim 18, wherein the image buffer defines and manages height offsets in the form of per-pixel height adjustments which are used for synthesis and which are added to an indexed exemplar value enabling exemplar terrain matches to be raised or lowered.

27. The system as claimed in claim 18, wherein the exemplar terrain template sampling component includes iteratively increasing the resolution of the sampled exemplar terrain and wherein the working terrain image is a multi-resolution structure.

28. A computer program product for synthesising a terrain, the computer program product comprising a non transitory computer-readable medium having stored computer-readable program code for performing the steps of:
   providing access to multiple exemplar terrain templates;
   generating a working terrain image with user-defined target terrain dimensions and an associated working terrain height image, including:
      providing user-defined constraints including height constraints;
      sampling a plurality of the exemplar terrain templates for addition of the templates to the working terrain image; and
      performing image synthesis to improve the working terrain image including height matching the exemplar terrain samples;
   controlling modification of the working terrain image by applying user-defined constraints to modify the synthesised terrain; and outputting the working terrain image as a synthesised terrain in the form of a synthesised height-field.

\* \* \* \* \*